United States Patent
Carwana et al.

(10) Patent No.: US 8,659,706 B2
(45) Date of Patent: Feb. 25, 2014

(54) MULTI-CHIP ANTENNA DIVERSITY PICTURE-IN-PICTURE ARCHITECTURE

(71) Applicants: James Carwana, Aliso Viejo, CA (US); Jun Tang, Irvine, CA (US); Philip Treigherman, Newport Beach, CA (US); Chaoliang T. Chen, Tustin, CA (US); Tracy Denk, Aliso Viejo, CA (US)

(72) Inventors: James Carwana, Aliso Viejo, CA (US); Jun Tang, Irvine, CA (US); Philip Treigherman, Newport Beach, CA (US); Chaoliang T. Chen, Tustin, CA (US); Tracy Denk, Aliso Viejo, CA (US)

(73) Assignee: Newport Media, Inc., Lake Forest, CA (US)

( * ) Notice: Subject to any disclaimer, the term of this patent is extended or adjusted under 35 U.S.C. 154(b) by 0 days.

(21) Appl. No.: 13/899,311

(22) Filed: May 21, 2013

(65) Prior Publication Data

US 2013/0271662 A1    Oct. 17, 2013

Related U.S. Application Data

(62) Division of application No. 12/894,789, filed on Sep. 30, 2010, now Pat. No. 8,482,675.

(51) Int. Cl.
*H04N 5/45*  (2011.01)
*H04N 5/44*  (2011.01)

(52) U.S. Cl.
USPC .......................................... 348/725; 348/565

(58) Field of Classification Search
USPC .................................................. 348/565, 725
See application file for complete search history.

(56) References Cited

U.S. PATENT DOCUMENTS

| | | | | |
|---|---|---|---|---|
| 6,035,037 A  * | 3/2000  | Chaney | ......................... | 380/227 |
| 6,970,564 B1 * | 11/2005 | Kubota et al. | ................. | 380/210 |
| 6,996,101 B2 * | 2/2006  | Coupe et al. | .................. | 370/389 |
| 7,283,104 B2 * | 10/2007 | Kim et al. | ......................... | 345/9 |
| 7,394,834 B2 * | 7/2008  | Milner | .......................... | 370/535 |
| 7,440,516 B2 | 10/2008 | Kim et al. | | |
| 7,609,792 B2 | 10/2009 | Palaskas et al. | | |
| 7,643,508 B2 * | 1/2010  | Furlong et al. | ................. | 370/437 |
| 2004/0073930 A1 | 4/2004 | Demas et al. | | |
| 2005/0036067 A1 * | 2/2005 | Ryal et al. | ...................... | 348/565 |
| 2005/0108778 A1 * | 5/2005 | Stone et al. | ................... | 725/138 |
| 2005/0177860 A1 | 8/2005 | Goyal et al. | | |
| 2005/0212968 A1 * | 9/2005 | Ryal | ............................. | 348/565 |
| 2006/0170828 A1 | 8/2006 | Muschallik et al. | | |
| 2006/0198476 A1 | 9/2006 | Palaskas et al. | | |

(Continued)

Primary Examiner — Brian Yenke
(74) Attorney, Agent, or Firm — Rahman LLC

(57) ABSTRACT

A multi-chip antenna diversity architecture and method includes a first receiver chip that receives a first input signal from a first antenna. The first receiver chip includes a first tuner that amplifies the first input signal, a crystal operatively connected to a first crystal oscillator circuit, and a first crystal oscillator clock buffer that receives a clock signal from the first crystal oscillator circuit. A first demodulator demodulates the input signal received from the first tuner. A second receiver chip receives a second input signal from a second antenna. The second receiver chip includes a second crystal oscillator circuit, a second crystal oscillator clock buffer, a second tuner, and a second demodulator that receives diversity data from the first demodulator. The first crystal oscillator clock buffer drives the clock signal to the second crystal oscillator clock buffer, the second tuner, and the second demodulator of the second receiver chip.

12 Claims, 6 Drawing Sheets

(56) References Cited

U.S. PATENT DOCUMENTS

| | | |
|---|---|---|
| 2006/0270372 A1 | 11/2006 | Bisanti et al. |
| 2007/0205939 A1 | 9/2007 | Bae |
| 2007/0286262 A1 | 12/2007 | Sestok et al. |
| 2008/0139123 A1 | 6/2008 | Lee et al. |
| 2009/0322960 A1 | 12/2009 | Takashima |
| 2010/0062737 A1 | 3/2010 | Zhong et al. |
| 2010/0110307 A1 | 5/2010 | Leme et al. |
| 2010/0323648 A1 | 12/2010 | Takano et al. |
| 2012/0063553 A1 | 3/2012 | Carwana et al. |
| 2012/0099625 A1 | 4/2012 | Djadi et al. |

\* cited by examiner

MULTI-CHIP ANTENNA DIVERSITY PICTURE-IN-PICTURE ARCHITECTURE

CROSS REFERENCE TO RELATED APPLICATION

This application is a divisional of U.S. patent application Ser. No. 12/894,789 filed on Sep. 30, 2010, the contents of which, in its entirety, is herein incorporated by reference.

BACKGROUND

1. Technical Field

The embodiments herein generally relate to a multi-chip antenna diversity architecture, and more particularly to, a multi-chip antenna diversity and picture-in-picture architecture.

2. Description of the Related Art

Antenna diversity is a wireless diversity scheme that uses two or more antennas to improve the quality and reliability of a wireless link. Often, especially in urban and indoor environments, there is no clear line-of-sight (LOS) between a transmitter and a receiver. Instead the signal is reflected along multiple paths before finally being received. Each of these bounces can introduce phase shifts, time delays, attenuations, and even distortions that can destructively interfere with one another at the aperture of the receiving antenna. Antenna diversity is especially effective at mitigating multipath situations.

Mobile television receivers can be integrated into a variety of devices ranging from low cost low performance products to the high cost high performance products. It is possible to design a single chip to address both ends of the market by creating a multi-chip diversity solution. For the low-performance market a single receiver can be used. For the high-performance market multiple receivers can be tied together to achieve the performance benefits associated with antenna diversity. When implementing a multi-chip diversity architecture, a synchronous transmission between chips is typically required, hence a clock signal generally must be transmitted along with the data.

FIG. 1 illustrates a block diagram of a traditional multi-chip diversity architecture 100 having a crystal oscillator connected to every receiver chip. A crystal oscillator uses the mechanical resonance of a vibrating crystal of piezoelectric material to create an electrical signal with a very precise frequency. This frequency is used to provide a stable clock signal and to stabilize frequencies for radio transmitters and receivers. In the multi-chip diversity architecture 100, multiple receiver chips 104A-N are connected to achieve the performance benefits associated with antenna diversity. The multi-chip diversity architecture 100 includes antennas 102A-N and receiver chips 104A-N. The receiver chips 104A-N include crystal oscillators 106A-N, tuners 108A-N, and demodulators 110A-N. The antennas 102A-N receive wireless signals. The crystal oscillators (XO) 106A-N generate signals at frequencies that ideally would be equivalent but in reality differ by tens or hundreds of parts-per-million (PPM). The tuners 108A-N receive and amplify the transmitted signal.

There are several disadvantages of the traditional multi-chip diversity architecture. In the traditional multi-chip diversity architecture 100, an independent crystal oscillator (XO) 106A-106N must be connected to each of the receiver chips 104A-N. Crystal oscillators are expensive components, and thus the bill of materials (BOM) cost is high for the multi-chip diversity architecture 100. Further, a reference clock is also required to be transmitted along with diversity data. The clock signal between chips 104A-104N is at least twice the data frequency. This high frequency signal can cause spurious emissions that can couple with the RF portion of the chip and reduce performance. Further, transmitting a clock signal between two chips increases chip overhead because this signal does not contain data. In addition, the multi-chip diversity architecture 100 is susceptible to frequency variations between a transmitter and a receiver that may lead to loss of synchronization.

Picture-in-Picture (PIP) is a feature of a television receiver in which one program is displayed on a full screen and one or more other programs are displayed in inset windows. In mobile television standards such as DVB-T and ISDB-T, the audio and video data are contained in a transport stream. The transport stream is composed of transport stream packets where each transport stream packet is labeled with a Program ID (PID). This PID indicates the contents of the transport stream packets. To implement PIP in a mobile television, a first receiver has to receive a first program composed of a first PID set and a second receiver has to receive a second program composed of a second PID set. A challenge to implementing PIP in mobile television is that when the first PID set and second PID set are merged and contain common PIDs, there is no way to distinguish whether the common PIDs belong to the first program or the second program.

Accordingly, there remains a need for an architecture that connects multiple chips using a single shared crystal oscillator thereby eliminating the frequency offset between receivers, reducing the bill of materials, and eliminating the need to transmit the reference clock between receivers. In addition, this architecture would also support PIP for mobile television by distinguishing the PIDs that are common between programs, thereby avoiding collisions between common PIDs.

SUMMARY

In view of the foregoing, an embodiment herein provides a multi-chip antenna diversity architecture including a first receiver chip that receives a first input signal from a first antenna. The first receiver chip includes a first tuner that amplifies the first input signal, a crystal operatively connected to a first crystal oscillator circuit, and a first crystal oscillator clock buffer operatively connected to the first crystal oscillator circuit. The first crystal oscillator clock buffer receives a clock signal from the first crystal oscillator circuit. A first demodulator is operatively connected to the first tuner. The first demodulator demodulates the input signal received from the first tuner. A second receiver chip receives a second input signal from a second antenna. The second receiver chip includes a second crystal oscillator circuit, a second crystal oscillator clock buffer operatively connected to the second crystal oscillator circuit, a second tuner that receives the clock signal from the first crystal oscillator clock buffer, and a second demodulator operatively connected to the second tuner. The second demodulator receives diversity data from the first demodulator. The first crystal oscillator clock buffer drives the clock signal to the second crystal oscillator clock buffer, the second tuner, and the second demodulator of the second receiver chip.

The multi-chip antenna diversity architecture may further include a third receiver chip including a third crystal oscillator circuit, a third crystal oscillator clock buffer operatively connected to the third crystal oscillator circuit, a third tuner that receives the clock signal from the first crystal oscillator clock buffer, and a third demodulator operatively connected to the third tuner. The third demodulator receives diversity data from the second demodulator. In one embodiment, no reference clock is transmitted from first receiver chip to the second receiver chip. The first crystal oscillator clock buffer drives the clock signal to the third crystal oscillator clock buffer, third second tuner, and the third demodulator of the third receiver chip. In one embodiment, no reference clock is transmitted from second receiver chip to the third receiver chip.

In another aspect, a method of decoding a transmission at a second receiver chip from a first receiver chip accounting for a clock phase offset between the first receiver chip and the second receiver chip in a multi-chip antenna diversity architecture is provided. The first receiver chip includes a crystal, and a first crystal oscillator circuit operatively connected to the crystal. The first crystal oscillator circuit generates a clock signal based on a frequency of the crystal. A crystal oscillator clock buffer is operatively connected to the first crystal oscillator circuit. A first clock phase locked loop (PLL) is operatively connected to the first crystal oscillator circuit. A first diversity transmitter transmits diversity data to the second receiver chip. The second receiver chip includes a second clock phase locked loop (PLL) coupled to the crystal oscillator clock buffer, and a second diversity receiver that receives diversity data from the first diversity transmitter.

The method may include generating a clock signal from the first crystal oscillator circuit of the first receiver chip, transmitting the clock signal to the second clock PLL, and transmitting a data stream that comprises a known synchronization pattern from the first receiver chip to the second receiver chip. The second diversity receiver may be synchronized with the first diversity transmitter to overcome a phase offset. The data stream comprises of a sequence of alternating '1' and '0' bits. The '1' and '0' bits are used as a preamble to allow the diversity receiver to overcome a phase offset and to synchronize with the first diversity transmitter. In one embodiment, the first diversity transmitter does not transmit any reference clock to the second diversity receiver. The crystal oscillator clock buffer drives the clock signal to a third receiver chip. In one embodiment, the second receiver chip does not transmit a reference clock to the third receiver chip.

In yet another aspect, a multi-chip antenna diversity architecture for mobile television that supports Picture-in-Picture (PIP) is provided. The multi-chip antenna diversity architecture includes a first receiver chip that receives a first program data that includes a first program ID (PID) set. The first receiver chip includes a crystal, and a first crystal oscillator circuit operatively connected to the crystal. The first crystal oscillator circuit generates a clock signal based on a frequency of the crystal. A crystal oscillator clock buffer is operatively connected to the first crystal oscillator circuit. The crystal oscillator clock receives the clock signal from the first crystal oscillator circuit. A first diversity transmitter transmits the first program data composed of the first program ID (PID) set.

A second receiver chip receives second program data that includes a second program ID (PID) set. The second receiver chip includes a second clock PLL that receives the clock signal from the crystal oscillator clock buffer, a second decoder that decodes the second program data, a second diversity receiver that receives the first program data from the first diversity transmitter, and a second Picture-in-Picture (PIP) combiner that combines the first program data received from the first diversity receiver with the second program data received from the second decoder to generate a combined PIP data stream. The second PIP combiner transmits the combined PIP data stream to a host processor.

The second PIP combiner includes a PID comparison module that compares the first PID set of the first program data with the second PID set of the second program data to detect an occurrence of a common PID. The second PIP combiner may further include a PID generation module that generates a new PID when the PID comparison module detects an occurrence of the common PID. The second PIP combiner may further include a PID remapping module that remaps the common PID to the new PID. In one embodiment, the first diversity transmitter does not transmit a reference clock to the second diversity receiver. In one embodiment, the first program data and the second program data include audio/video data. In another embodiment, the first program data and the second program data include non-audio/video data. In another embodiment, the first program data includes audio/video data and the second program data includes non-audio/video data.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

Figure 1:
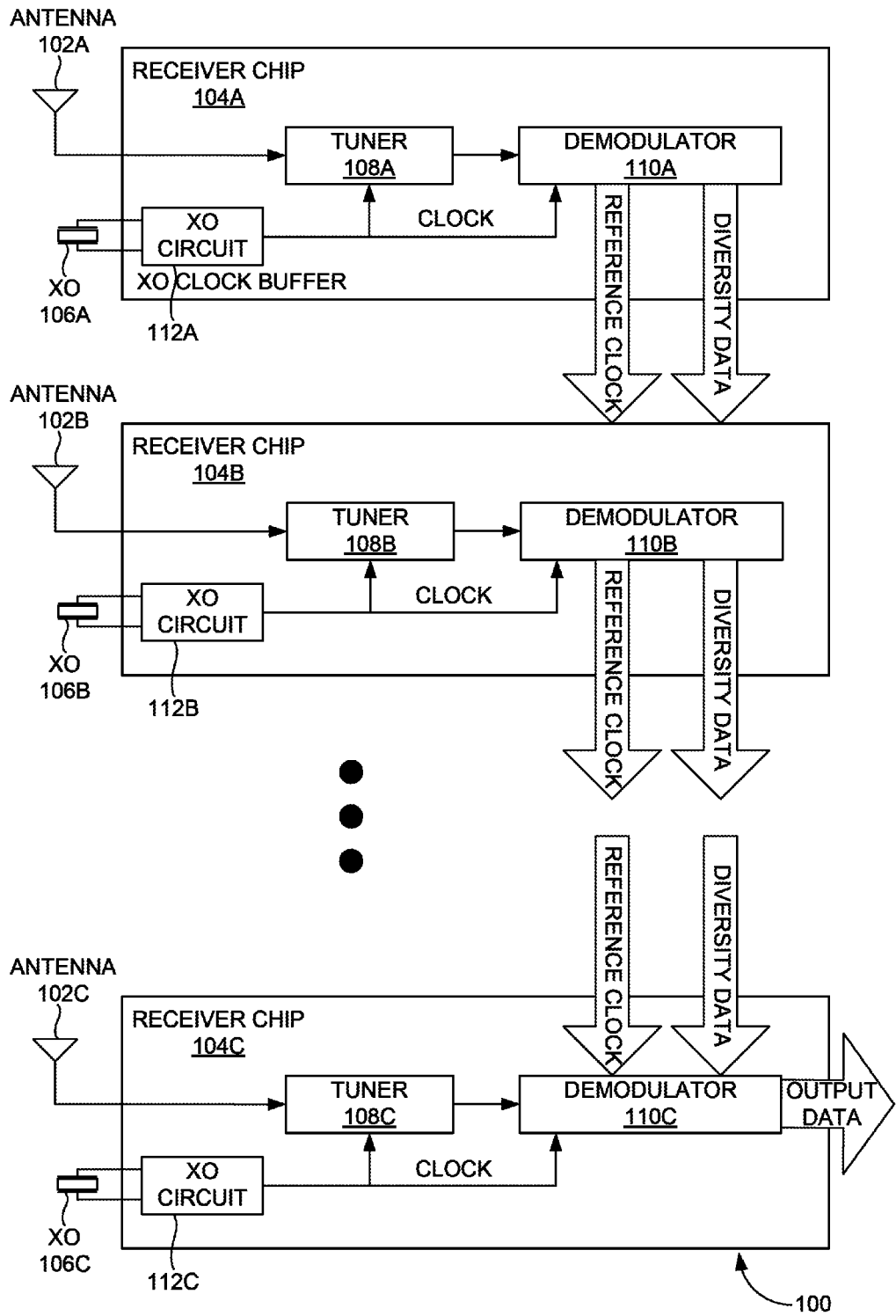
FIG. 1 illustrates a block diagram of a traditional multi-chip diversity architecture having a crystal oscillator connected to every receiver chip.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein. As mentioned, there remains a need for architecture to connect multiple chips using a low pin count by sharing a single crystal oscillator. The embodiments herein achieve this by sharing a crystal oscillator. Referring now to the drawings, and more particularly to FIG. 2 through FIG. 6, where similar reference characters denote corresponding features consistently throughout the figures, there are shown preferred embodiments. As used herein, "N" refers to a predetermined number of components.

Figure 2:
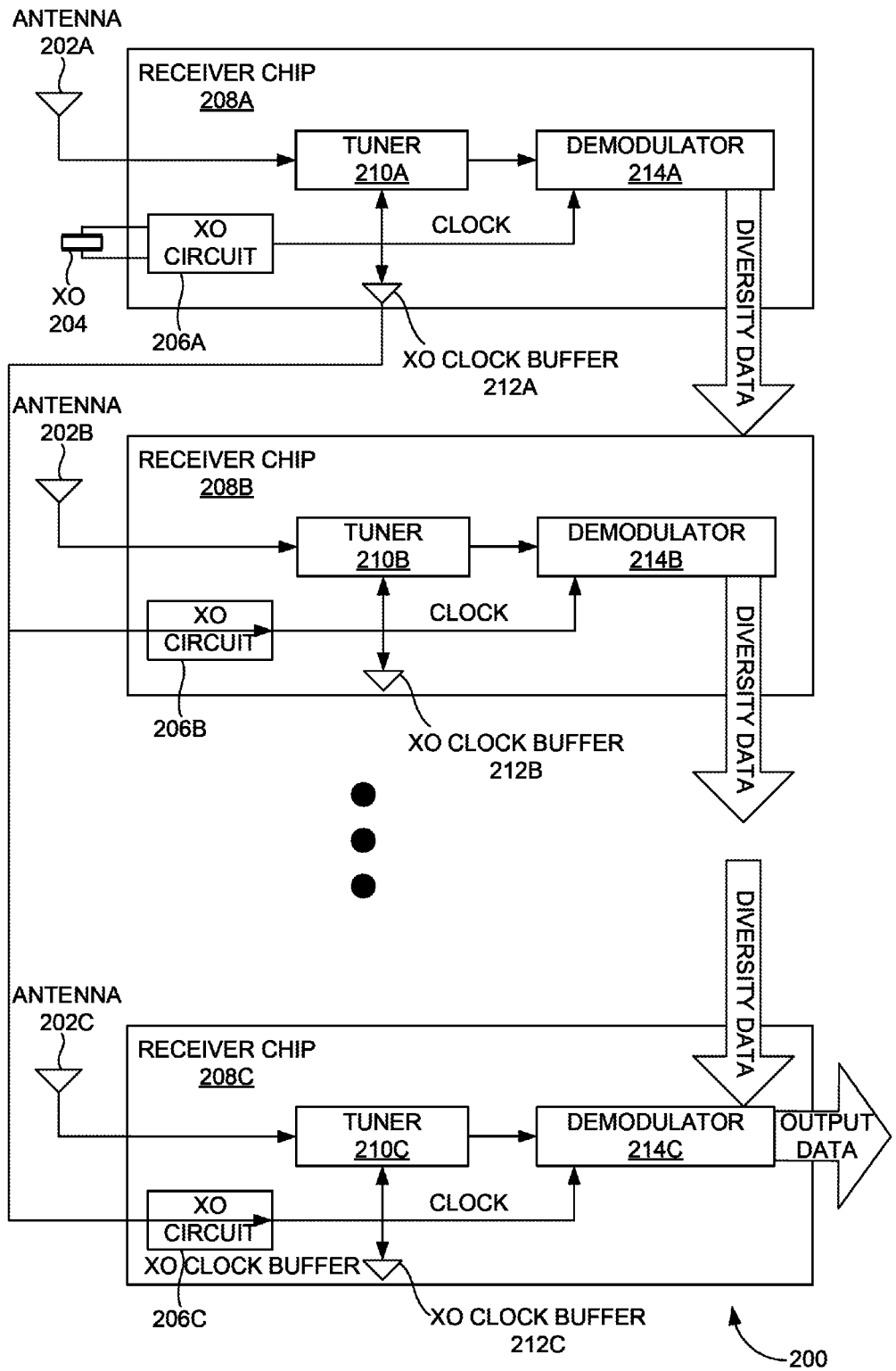
FIG. 2 illustrates a block diagram of a multi-chip diversity architecture having a single crystal according to an embodiment herein.

FIG. 2 illustrates a block diagram of a multi-chip diversity architecture 200 having a single crystal 204 according to the embodiments herein. The multi-chip diversity architecture 200 includes antennas 202A-N, the crystal 204, crystal oscillator circuits 206A-N, receiver chips 208A-N, tuners 210A-N, crystal oscillator clock buffers 212A-N, and demodulators 214A-N. The receiver chip 208A receives an input signal from the antenna 202A. The crystal 204 is directly connected to the tuner 210A. The tuner 210A-N amplifies input signals from the antennas 202A-N. In one embodiment, the tuner 210A amplifies input signal received from the antenna 202A. In another embodiment, the tuner 210B amplifies input signal received from the antenna 202B. In yet another embodiment, the tuner 210C amplifies input signal received from the antenna 202C. The crystal oscillator clock buffer 212A is directly connected to the tuner 208A.

The crystal oscillator clock buffer 212A receives clock signals from the crystal oscillator circuit 206A and transmits the clock signals to the tuners 210B-N, the demodulators 214B-N, and the crystal oscillator clock buffer 210B-N. The demodulators 214A-N are directly connected to the tuners 210A-N. In one embodiment, the demodulator 214A is directly connected to the tuner 210A. In another embodiment, the demodulator 214B is directly connected to the tuner 210B. In yet another embodiment, the demodulator 214C is directly connected to the tuner 210C. The demodulators 214A-N demodulate the input signals received from tuners 210A-N. In one embodiment, the demodulator 214A demodulates the input signal received from the tuner 210A. In another embodiment, the demodulator 214B demodulates the input signal received from the tuner 210B. In yet another embodiment, the demodulator 214C demodulates the input signal received from the tuner 210C.

The receiver chip 208B receives the clock signals from the crystal oscillator clock buffer 212A. In one embodiment, the crystal oscillator clock buffer 212A drives the clock signal to the tuner 210B, the crystal oscillator clock buffer 212B, and the demodulator 214B of the receiver chip 208B. The demodulator 214B of receiver chip 208B receives only diversity data from the demodulator 214A of receiver chip 208A. In one embodiment, no reference clock is transmitted from the receiver chip 208A to the receiver chip 208B. Additionally, the multi-chip diversity architecture 200 may include a third receiver chip, a fourth receiver chip, etc (shown as receiver chip 208N).

The receiver chip 208N includes a tuner 210N, a demodulator 214N, that receives the clock signals from the crystal oscillator clock buffer 212A. The demodulator 214N is directly connected to the tuner 210N. The demodulator 214N receives diversity data from the demodulator 214B. In one embodiment, the demodulator 214N may receive diversity data from the demodulator 214 (N-1) (not shown in FIG. 2). The crystal oscillator clock buffer 212A drives the clock signal to the tuner 210N, the crystal oscillator clock buffer 212N, and the demodulator 214N of the receiver chip 208N. In one embodiment, no reference clock is transmitted from the receiver chip 208 (N-1) to the receiver chip 208N.

Figure 3:
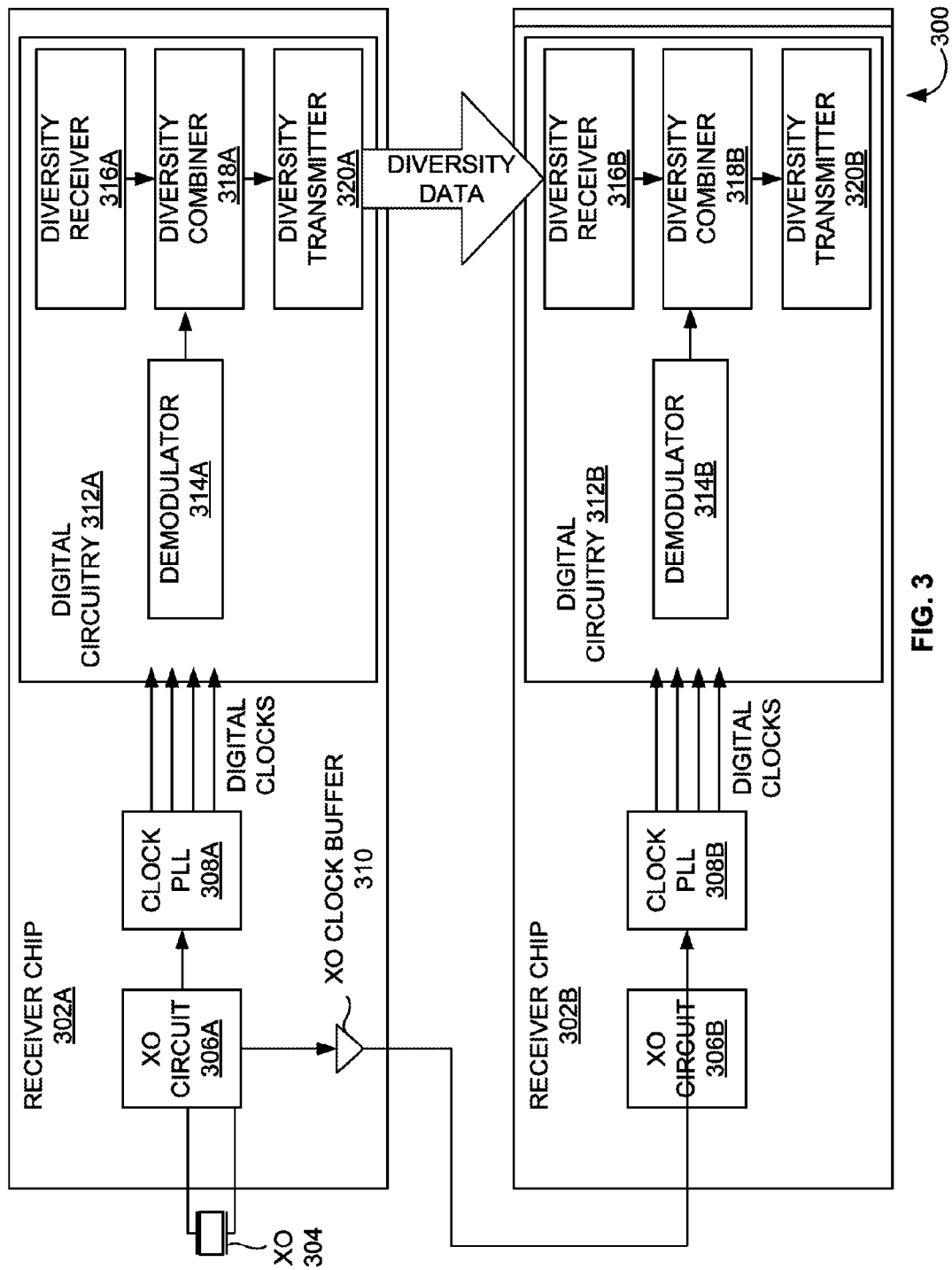
FIG. 3 illustrates a block diagram of a multi-chip diversity architecture with cross chip communication according to an embodiment herein.

FIG. 3 illustrates a block diagram of a multi-chip diversity architecture 300 with cross chip communication according to an embodiment herein. The multi-chip diversity architecture 300 includes a receiver chip 302A and a receiver chip 302B. The receiver chip 302A includes a crystal 304, a crystal oscillator circuit 306A, a clock PLL 308A, a crystal oscillator clock buffer 310, and a digital circuitry 312A. The digital circuitry 312A includes a demodulator 314A, a diversity receiver 316A, a diversity combiner 318A, and a diversity transmitter 320A. The receiver chip 302B includes a crystal oscillator circuit 306B, a clock PLL 308B, and a digital circuitry 312B.

The digital circuitry 312B includes a demodulator 314B, a diversity receiver 316B, a diversity combiner 318B, and a diversity transmitter 320B. The crystal 304 is directly connected to the crystal oscillator circuit 306A. The clock PLL 308A is directly connected to the crystal oscillator circuit 306A. The crystal oscillator circuit 306A generates clock signal based on a frequency of the crystal 304 and transmits the clock signals to the clock PLL 308A. In another embodiment, the crystal oscillator clock buffer 310 transmits the clock signals to the clock PLL 308B of the receiver chip 302B.

The receiver chip 302A transmits a stream that includes a known synchronization pattern to the receiver chip 302B. In one embodiment, the diversity transmitter 320A transmits the known synchronization pattern to the diversity receiver 316B. In an example embodiment, the stream includes a sequence of alternating '1' and '0' bits which may be used as a preamble to allow the diversity receiver 316B to gain synchronization with the stream from the diversity transmitter 320A. In one embodiment, the stream transmitted from the receiver chip 302A to the receiver chip 302B is diversity data. The diversity transmitter 320A does not transmit a reference clock to the diversity receiver 316B. Additionally, the crystal oscillator clock buffer 310 may drive the clock signal to a third receiver chip (not shown). Further, the receiver chip 302B does not transmit a reference clock to the third receiver chip (not shown).

Figure 4:
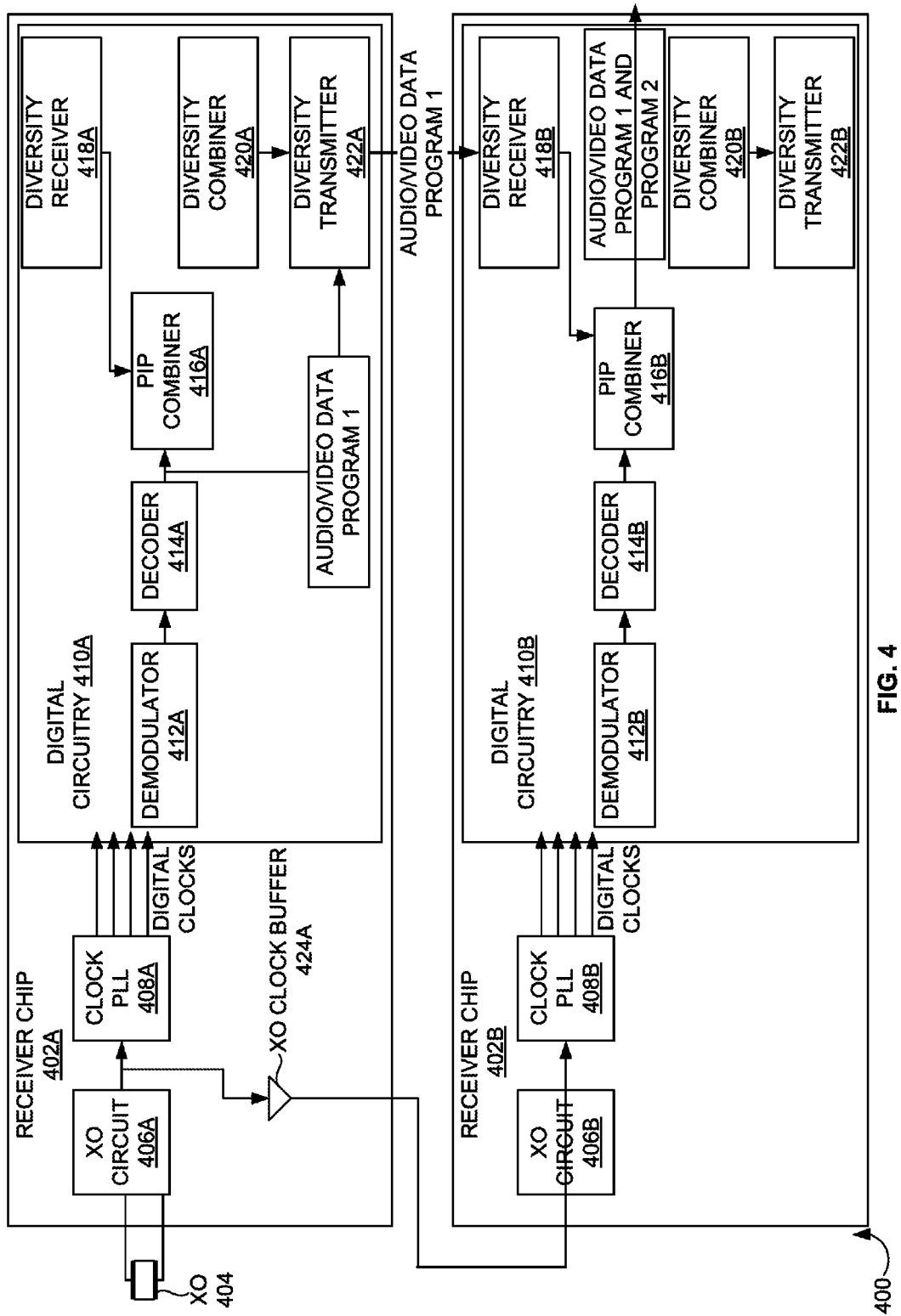
FIG. 4 illustrates a block diagram of a multi-chip antenna diversity architecture for mobile television that supports PIP according to an embodiment herein.

FIG. 4 illustrates a block diagram of a multi-chip antenna diversity architecture 400 for mobile television that supports PIP according to an embodiment herein. The multi-chip antenna diversity architecture 400 includes a receiver chip 402A connected to a receiver chip 402B. The receiver chip 402A includes and a crystal 404, a crystal oscillator circuit 406A, a clock PLL 408A, a digital circuitry 410A. The receiver chip 402B includes a crystal oscillator circuit 406B, a clock PLL 408B, a digital circuitry 410B.

The digital circuitry 410A further includes a demodulator 412A, a decoder 414A, a PIP combiner 416A, a diversity receiver 418A, a diversity combiner 420A, and a diversity transmitter 422A. The receiver chip 402A further includes a crystal oscillator clock buffer 424A. The digital circuitry 410B further includes a demodulator 412B, a decoder 414B, a PIP combiner 416B, a diversity receiver 418B, a diversity combiner 420B, and a diversity transmitter 422B. The PIP combiner 406A is used to combine the program data from the receiver chips. In the receiver chip 402A there is only one program is available. Thus, there is no need to combine the program data.

The receiver chip 402A receives first program data that includes a first program ID (PID) set. The receiver chip 402B receives second program data that includes a second program ID (PID) set. In one embodiment, the first program data and the second program data include audio/video data from television program 1 and television program 2 respectively. In another embodiment, the first program data and the second program data includes non-audio/video data. In another embodiment, the first program data includes audio/video data and the second program data includes non-audio/video data. In an example embodiment, the receiver chip 402A may be decoding a real time stock prices and the receiver chip 402B may be decoding audio/video data.

The crystal oscillator circuit 406A is directly connected to the crystal 404. The crystal oscillator circuit 406A generates clock signal based on the frequency of the crystal 404. The clock PLL 408A is directly connected to the crystal oscillator circuit 406A. The diversity transmitter 422A transmits the first program data (that includes audio/video data) composed of the first program ID (PID) set to the diversity receiver 418B. In one embodiment, the first program data is demodulated by the demodulator 412A and is decoded by the decoder 414A before being transmitted to diversity receiver 418B by the diversity transmitter 422A.

The demodulator 412B demodulates the second program data which is transmitted to the decoder 414B. The decoder 414B decodes the demodulated second program data. The crystal oscillator clock buffer 424 is directly connected to the crystal oscillator circuit 406A. The crystal oscillator clock buffer 424 receives the clock signal from the crystal oscillator circuit 406A and transmits to the clock PLL 408B.

The PIP combiner 416B combines the first program data received from the diversity receiver 418B with the second program data received from the decoder 418B to generate a combined PIP data stream. The PIP combiner 416B transmits the combined PIP data stream to a host processor. The diversity transmitter 422A does not transmit a reference clock to the diversity receiver 418B.

Figure 5:
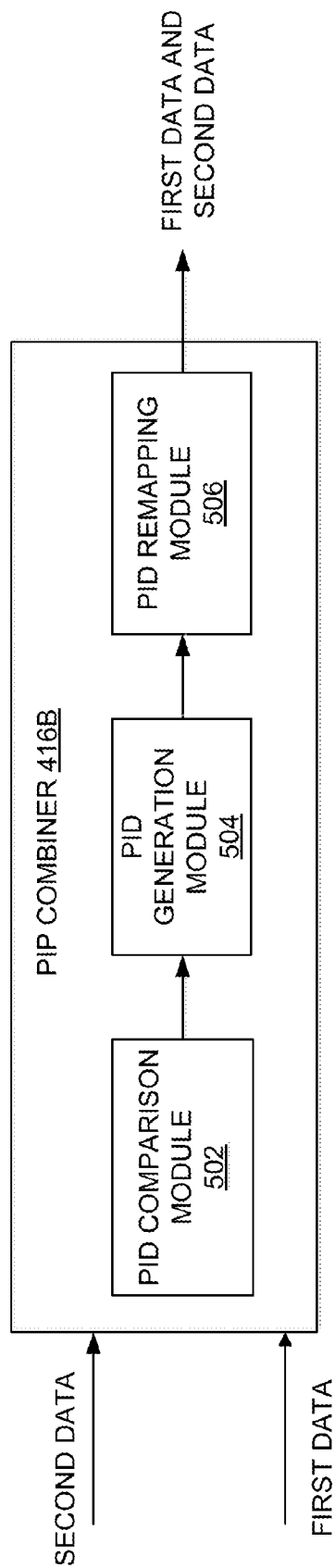
FIG. 5 illustrates an exploded view of the second PIP combiner of the second digital circuitry of the second receiver chip of FIG. 4 according to an embodiment herein.

With reference to FIG. 4, FIG. 5 illustrates an exploded view of the PIP combiner 416B of the digital circuitry 410B of the receiver chip 402B of FIG. 4 according to an embodiment herein. The PIP combiner includes a PID comparison module 502, a PID generation module 504, and a PID remapping module 506. In one embodiment, the PIP combiner 416B receives the first program data from the diversity receiver 418B. In another embodiment, the PIP combiner 416B receives the second program data from the decoder 414B of the digital circuitry 410B. The first program data includes a first PID set. The second program data includes a second PID set.

The PID comparison module 502 compares the first PID set of the first program data with the second PID set of the second program data to detect an occurrence of a common PID. The PID generation module 504 generates a new PID if the PID comparison module 502 detects an occurrence of the common PID. The PID remapping module 506 remaps the common PID to the new PID. In one embodiment, the first program data and the second program data include audio/video data. In another embodiment, the first program data and the second program data include non-audio/video data. In another embodiment, the first program data includes audio/video data and the second program data includes non-audio/video data.

Figure 6:
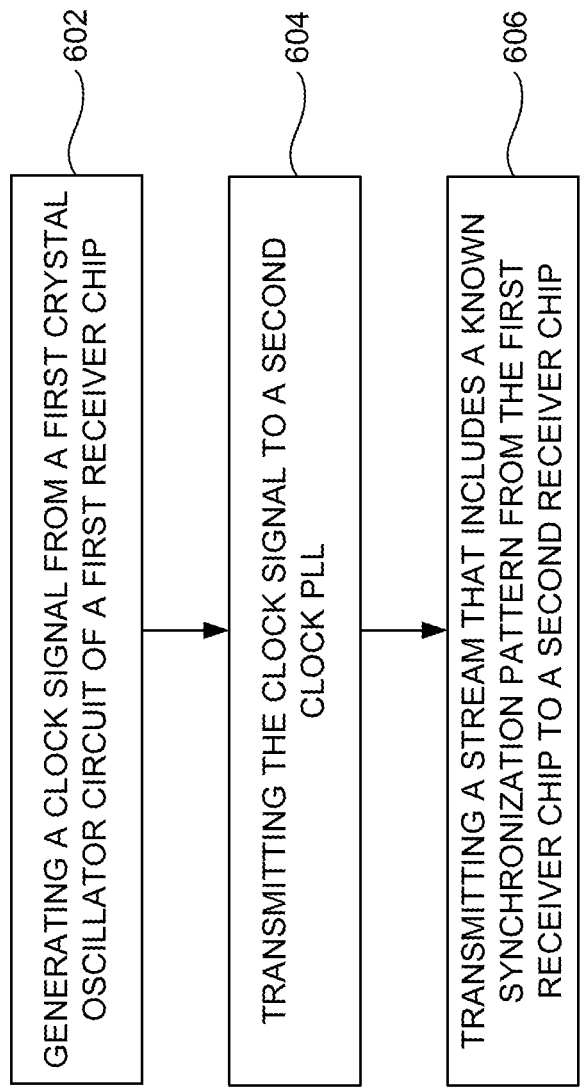
FIG. 6 is a flow diagram illustrating a method according to an embodiment herein.

FIG. 6, with reference to FIGS. 2 through 5, is a flow diagram illustrating a method of decoding a transmission from the first receiver chip 402A of FIG. 4 at the second receiver chip 402B of FIG. 4 accounting for a clock phase offset between the first receiver chip 402A and the second receiver chip 402B in the multi-chip antenna diversity architecture 400 according to an embodiment herein. The first receiver chip 402A includes a crystal 404, a first crystal oscillator circuit 406A is operatively connected to the crystal 404. The crystal oscillator generates a clock signal based on a frequency of the crystal 404. The crystal oscillator clock buffer 424A is operatively connected to the first crystal oscillator circuit 406A. The first clock phase locked loop (PLL) 408A is operatively connected to the first crystal oscillator circuit 406A. The first diversity transmitter 422A transmits diversity data to the second receiver chip 402B. The second receiver chip 402B includes a second clock phase locked loop (PLL) 408B coupled to the crystal oscillator clock buffer 424A. The second diversity receiver 418B receives diversity data from the first diversity transmitter 422A.

In step 602, a clock signal is generated from the first crystal oscillator circuit of the first receiver chip 402A. In one embodiment, the clock signal is generated based on a frequency of the crystal 404. In step 604, the clock signal is transmitted to the second clock PLL 408B. In step 606, a stream that includes a known synchronization pattern is transmitted from the first receiver chip 402A to the second receiver chip 402B.

The second diversity receiver 418B may be synchronized with the stream from the first diversity transmitter 422A. The stream includes a sequence of alternating '1' and '0' bits. The '1' and '0' bits are used as a preamble to allow the second diversity receiver 418B to synchronize with the stream from the first diversity transmitter 422A. The first diversity transmitter 422A does not transmit any reference clock to the second diversity receiver 418B. The crystal oscillator clock buffer 424A may drive the clock signal to a third receiver chip (not shown in FIG. 4). The second receiver chip 402B does not transmit a reference clock to the third receiver chip (not shown in FIG. 4).

In the multi-chip antenna diversity and picture-in-picture architecture provided by the embodiments herein, all the receiver chips are driven by the same crystal oscillator circuit and the receiver chips are frequency synchronous. Additionally, there is no need of transmitting a reference clock between the receiver chips. Only the diversity data is transmitted between the receiver chips. This architecture further provides a one-time synchronization between the receiver chips which does not vary with time. In other words, after the initial synchronization between the receiver chips there will be no overhead in the diversity data transmission thus overcoming communication errors. The communication errors caused by phase clock offset are corrected by sending a known synchronization pattern from receiver chip 1 to receiver chip N. For example, a sequence of alternating '1' and '0' bits are used as a preamble to allow the diversity receiver of the second or Nth receiver chip to gain synchronization with the incoming stream from the diversity transmitter of the first receiver chip.

Additionally, the architecture overcomes implementing PIP in mobile television when the first PID set and second PID set are merged and contain common PIDs and when there is no way to distinguish whether the common PIDs belong to the first program or the second program. This is overcome by having a PIP combiner in the second receiver chip that compares the PID set of the first program data with the PID set of the second program data to detect an occurrence of a common PID. The PIP combiner then generates a new PID if an occurrence of the common PID is detected and then remaps the common PID to the new PID.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

Therefore, while the embodiments herein have been described in terms of preferred embodiments, those skilled in the art will recognize that the embodiments herein can be practiced with modification within the spirit and scope of the appended claims.

What is claimed is:

1. A multi-chip antenna diversity architecture for mobile television that supports Picture-in-Picture (PIP), said multi-chip antenna diversity architecture comprising:
   a first receiver chip that receives a first program data that includes a first program ID (PID) set, said first receiver chip comprising:
      a crystal;
      a crystal oscillator circuit operatively connected to said crystal, wherein said crystal oscillator circuit generates a clock signal based on a frequency of said crystal;
      a crystal oscillator clock buffer operatively connected to said crystal oscillator circuit, wherein said crystal oscillator clock buffer receives said clock signal from said crystal oscillator circuit; and
      a diversity transmitter that transmits said first program data composed of said first program ID (PID) set;
   a second receiver chip that receives second program data that includes a second program ID (PID) set, said second receiver chip comprising:
      a clock phase locked loop (PLL) that receives said clock signal from said crystal oscillator clock buffer;
      a decoder that decodes said second program data;
      a diversity receiver that receives said first program data from said diversity transmitter, wherein said diversity receiver does not receive a reference clock signal from said diversity transmitter and wherein said crystal does not directly transmit a signal to said second receiver chip; and
      a Picture-in-Picture (PIP) combiner that combines said first program data received from said diversity receiver with said second program data received from said decoder to generate a combined PIP data stream, wherein said PIP combiner comprises a PID comparison module that compares said first PID set of said first program data with said second PID set of said second program data to detect an occurrence of a common PID.

2. The multi-chip antenna diversity architecture of claim 1, wherein said PIP combiner transmits said combined PIP data stream to a host processor.

3. The multi-chip antenna diversity architecture of claim 1, wherein said PIP combiner comprises a PID generation module that generates a new PID when said PID comparison module detects an occurrence of said common PID.

4. The multi-chip antenna diversity architecture of claim 3, wherein said PIP combiner comprises a PID remapping module that remaps said common PID to said new PID.

5. The multi-chip antenna diversity architecture of claim 1, wherein said first program data and said second program data comprise audio/video data.

6. The multi-chip antenna diversity architecture of claim 1, wherein said first program data and said second program data comprise non-audio/video data.

7. A multi-chip antenna diversity architecture comprising:
   a first receiver chip that receives a first program data comprising a first program ID (PID) set, wherein said first receiver chip comprises:
      a crystal oscillator that generates a clock signal;
      a crystal oscillator clock buffer that receives said clock signal; and
      a diversity transmitter that transmits said first program data comprising said first PID set;
   a second receiver chip that receives second program data comprising a second PID set, wherein said second receiver chip comprises:
      a clock phase locked loop (PLL) that receives said clock signal;
      a decoder that decodes said second program data;
      a diversity receiver that receives said first program data from said diversity transmitter, wherein said diversity receiver does not receive a reference clock signal from said diversity transmitter and wherein said crystal does not directly transmit a signal to said second receiver chip; and
      a Picture-in-Picture (PIP) combiner that combines said first program data received from said diversity receiver with said second program data received from said decoder to generate a combined PIP data stream, wherein said PIP combiner comprises a PID comparison module that compares said first PID set of said first program data with said second PID set of said second program data to detect an occurrence of a common PID.

8. The multi-chip antenna diversity architecture of claim 7, wherein said PIP combiner transmits said combined PIP data stream to a host processor.

9. The multi-chip antenna diversity architecture of claim 7, wherein said PIP combiner comprises a PID generation module that generates a new PID when said PID comparison module detects an occurrence of said common PID.

10. The multi-chip antenna diversity architecture of claim 9, wherein said PIP combiner comprises a PID remapping module that remaps said common PID to said new PID.

11. The multi-chip antenna diversity architecture of claim 7, wherein said first program data and said second program data comprise audio/video data.

12. The multi-chip antenna diversity architecture of claim 7, wherein said first program data and said second program data comprise non-audio/video data.

* * * * *